(12) United States Patent
Moir (10) Patent No.: US 7,818,513 B2
(45) Date of Patent: Oct. 19, 2010

(54) COORDINATING ACCESSES TO SHARED OBJECTS USING TRANSACTIONAL MEMORY MECHANISMS AND NON-TRANSACTIONAL SOFTWARE MECHANISMS

(75) Inventor: Mark S. Moir, Hampton, NH (US)

(73) Assignee: Oracle America, Inc., Redwood City, CA (US)

( * ) Notice: Subject to any disclaimer, the term of this patent is extended or adjusted under 35 U.S.C. 154(b) by 754 days.

(21) Appl. No.: 11/694,323

(22) Filed: Mar. 30, 2007

(65) Prior Publication Data

US 2007/0186069 A1 Aug. 9, 2007

Related U.S. Application Data

(63) Continuation-in-part of application No. 11/591,919, filed on Nov. 2, 2006, which is a continuation-in-part of application No. 10/915,502, filed on Aug. 10, 2004, now Pat. No. 7,395,382.

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)

(52) U.S. Cl. ........................ 711/150; 711/100; 711/111; 711/112; 711/141; 711/144; 711/145; 711/146; 711/147; 711/148; 711/156; 707/638

(58) Field of Classification Search ........................ None
See application file for complete search history.

(56) References Cited

U.S. PATENT DOCUMENTS

| 5,428,761 | A | * | 6/1995 | Herlihy et al. ............... 711/130 |
| 5,761,721 | A | | 6/1998 | Baldus et al. |
| 6,816,947 | B1 | | 11/2004 | Huffman |
| 7,188,219 | B2 | | 3/2007 | Jeddeloh |

(Continued)

OTHER PUBLICATIONS

Moir, et al., "Hybrid Transactional Memory," ASPLOS '06, San Jose, CA, Oct. 21-25, 2006.

(Continued)

*Primary Examiner*—Stephen C Elmore
*Assistant Examiner*—Marwan Ayash
(74) *Attorney, Agent, or Firm*—Robert C. Kowert; Meyertons, Hood, Kivlin, Kowert & Goetzel, P.C.

(57) ABSTRACT

Transactional memory (TM) may be used in conjunction with various synchronization mechanisms, such as that copy a current version of an object, update the copy, and then cause the copy to become current atomically by changing a "current version" indicator. Software operations to modify an object may first make a private copy of the object, modify the private copy, and atomically make the private copy the current version while verifying that no other software operation or transaction has concurrently updated the object. A transaction may be used to update the current copy of a collection of data "in place" and thereby avoiding the necessity to make a copy of the data being modified. If the transactional memory mechanism is unable to complete the transaction to modify the collection of data in place, a set of software operations may be used to modify the collection of data.

20 Claims, 7 Drawing Sheets

U.S. PATENT DOCUMENTS

| | | | |
|---|---|---|---|
| 2004/0015642 A1* | 1/2004 | Moir et al. ..................... | 711/1 |
| 2006/0288173 A1 | 12/2006 | Shen | |
| 2007/0028056 A1 | 2/2007 | Harris | |
| 2007/0055960 A1 | 3/2007 | Damron | |

OTHER PUBLICATIONS

Rajwar, et al, "Speculative Lock Elision: Enabling Highly Concurrent Multithreaded Execution," Proceedings of the 34th International Symposium on Microarchitecture (MICRO), Dec. 3-5, 2001, Austin TX.

Herlihy, et al, "Software Transactional Memory for Dynamic Data Structures," Proceedings of the 22nd Annual ACM Symposium on Principles of Distributed Computing, Boston, MA, 2003.

Rajwar, et al, "Transactional Lock-Free Execution of Lock-Based Programs," Proceedings of the 10th International Conference on Architectural Support for Programming Languages and Operating Systems (ASPLOS), Oct 6-9, 2002, San Jose, CA.

Herlihy, "A Methodology for Implementing Highly Concurrent Data Objects," ACM Transactions on Programming Languages and Systems (TOPLAS), vol. 15, Issue 5 (Nov. 1993).

* cited by examiner

COORDINATING ACCESSES TO SHARED OBJECTS USING TRANSACTIONAL MEMORY MECHANISMS AND NON-TRANSACTIONAL SOFTWARE MECHANISMS

CONTINUATION DATA

This application is a Continuation-In-Part of U.S. patent application 11/591,919 titled, "System and Method for Supporting Multiple Alternative Methods for Executing Transactions," filed Nov. 2, 2006, whose inventors were Peter C. Damron, Yosef Lev and Mark S. Moir and which is a Continuation-In-Part of U.S. patent application Ser. No. 10/915,502 titled "Hybrid Software/Hardware Transactional Memory," filed Aug. 10, 2004, now U.S. Pat. No. 7,395,382, whose inventor was Mark S. Moir, and which are both herein incorporated by reference in their entirety.

BACKGROUND OF THE INVENTION

1. Field of the Invention

This invention relates generally to concurrent access to shared objects, and more particularly, to a system and method for implementing multiple, alternative techniques for concurrent access to shared objects.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Such assurances have often been provided by using locks to prevent other threads from accessing the data affected by an ongoing operation. Unfortunately, the use of locks may give rise to a number of problems, both in terms of software engineering and in terms of performance. First, the right "balance" of locking must be achieved, so that correctness can be maintained, without preventing access to an unnecessary amount of unrelated data (thereby possibly causing other threads to wait when they do not have to). Furthermore, if not used carefully, locks can result in deadlock, causing software to freeze up. Moreover, it is frequently the case that whenever a thread is delayed (e.g. preempted) while holding a lock, other threads must wait before being able to acquire that lock.

Transactional memory is a paradigm that allows the programmer to design code as if multiple locations can be accessed and/or modified in a single atomic step. As typically defined, a transactional memory interface allows a programmer to designate certain sequences of operations as "transactions", which are guaranteed by the transactional memory implementation to either take effect atomically and in their entirety (in which case we say that they succeed), or have no externally visible effect (in which case we say that they fail). Thus, in many cases, it is possible to complete multiple operations with no possibility of another thread observing partial results, even without holding any locks. The transactional paradigm can significantly simplify the design of concurrent programs.

Transactional memory is widely recognized as a promising paradigm for allowing a programmer to make updates to multiple locations in a manner that is apparently atomic, while addressing many of the problems associated with the use of locks. In general, transactional memory can be implemented in hardware, with the hardware directly ensuring that a transaction is atomic, or in software that provides the "illusion" that the transaction is atomic, even though in fact it is executed in smaller atomic steps by the underlying hardware.

Most designs implement or support only a single type of transactional memory implementation. Moreover, a programmer generally must know about, and write code to support, the particular interfaces for implementing transactional memory. Furthermore, even if a system supports a particular transactional memory implementation that implementation may not be guaranteed for all transactions. For example, a system may support a "best-effort" transaction memory implementation, but since the implementation is "best-effort" not all transactions may be guaranteed to be supported. Thus, a programmer may wish to include functionality to fall back to more flexible, if slower, transactional memory implementation that may guarantee support for all transactions. In order to do so, the programmer may have to specifically write code to support both the faster "best-effort" implementation and the slower fallback implementation at every location in the application for which the programmer wishes to execute instructions atomically.

SUMMARY

Transactional memory (TM) may be used in conjunction with various synchronization mechanisms, such as mechanisms that copy a current version of an object, update the copy, and then cause the copy to become current atomically by changing a "current version" indicator. Software operations to modify an object, block of shared memory, or other collection of data, may first make a private copy of the object, modify the private copy, and atomically make the private copy the current version while verifying that no other software operation or transaction has concurrently updated the object.

A transactional memory mechanism may be used to update the current copy of a collection of data "in place" and thereby avoiding the necessity to make a copy of the data being modified. Using transactional memory may also allow parallelism (e.g., allowing more than one transaction or operation to occur concurrently), while still maintaining the ability to use a software mechanism to modify the collection of data if the transactional memory is unable to complete a particular operation. In other words, if the transactional memory mechanism is unable to complete the transaction to modify the collection of data in place, a set of software operations may be used to modify the collection of data, such as to make a copy of the data, modify the copy, and then atomically make the copy the "current" version.

Additionally, in some embodiments, changes may be applied to a current object or collection of data using transactional memory, and an indication of which object/data collection is current may be included in the readset of the transaction. In other words, the transactional memory mechanism may monitor the indication of which object/data collection is current and detect if that indication is changed or modified during the transaction.

Using this approach, if the transactional memory is unable to commit a particular transaction for some reason, the thread may use a software copy-update-replace mechanism, described above, and any concurrent transactions may be aborted because the indication of the current version of the object/data collection will be changed by the software copy-update-replace mechanism. Thus, if even a particular transaction memory mechanism does not support all required transactions, the transactional memory mechanism may be tried since the software copy-update-replace mechanism may be used for any transaction the transactional memory mechanism fails to complete.

Additionally, because transactional memory mechanisms may only read (but not modify) an indication of which version of an object or data collection (e.g., the original or a modified copy) is current, multiple concurrent operations may succeed in parallel, provided they do not conflict on any particular piece of the updated data. By contrast, software-only mechanisms, such as the above-described copy-update-replace mechanism, may preclude such parallelism.

Additionally, transactional memory mechanisms to update shared memory objects (or data collections) in place may coordinate with concurrent software operations by maintaining and monitoring an ownership indication for a particular object, data collection or, in general, any block of shared memory. For example, a particular memory location may be used to indicate whether a particular object may be modified by a transaction or by a software mechanism.

To ensure that software operations (e.g., that modify an object or block of shared memory) obtain a consistent copy of the object/data collection to be modified, an ownership indicator, such as a bit that indicates whether the object is in transactional or software mode may be used to coordinate between the transactional memory mechanism and the software operations. In one embodiment such an indicator may be included in a current-version indication. For example, the least significant bit of a pointer to the current version of an object may be used as an ownership indication specifying whether a transactional memory mechanism or a software mechanism (such as the copy-update-replace mechanism) may modify the object.

In some embodiments, the default value for the bit may indicate that the object/data collection is in transactional mode, and the value of the bit may be modified only when a thread is forced to use software mode instead. Transactions may verify that the ownership indicator indicates a transactional mode before completing a transaction, and may abort a transaction if a software mode is indicated. In such cases the transaction may be retried, either again using a transaction or, perhaps after a number of unsuccessful retries, in software mode. If a software mode is indicated, a software mechanism (e.g., copy-update-replace) may modify the object. In some embodiments, the ownership indicator may need to be changed to indicate a transactional mode before transactions can proceed again. Thus, the ownership indicator for a block of shared memory (or other collection of data) may initially specify that transactions will be used, or attempted, first and only if a transaction is unable to complete (e.g. commit modifications to the block of shared memory) will the ownership indicator be changed to indicate a software mode. Once the ownership indicator specifies a software mode, a software mechanism, such as a set of software operations to perform a copy-update-replace, may be attempted to modify the block of shared memory.

In some embodiments, the ownership indicator may be changed back to specify a transactional mode after the software operations have successfully modified the block of shared memory so that the transactional memory mechanism may be attempted the next time the block of shared memory is modified. In other embodiments, however, the ownership indicator may remain unchanged, thus indicating a software mode, such as to prevent unnecessarily attempting a transaction that will likely fail to complete.

Note that the techniques described herein for coordinating transactional memory mechanisms with software mechanisms for modifying shared memory may be applied to multiple objects/data collections. For example, transactions in an object-based dynamic software transactional implementation may be performed entirely using transactions. Other transactions may be executed partially in hardware and partially in software. For example, the copy-update-replace software mechanism may be applied to some objects accessed by the implemented transaction, and the above-described hardware-assisted approach may be used to commit the software parts of the transaction and the remainder of the transaction atomically.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As noted above, transactional memory (TM) may be used in conjunction with various software synchronization mechanisms that copy a current version of an object, update the copy, and then cause the copy to become current atomically by changing a "current version" indicator. For example, a pointer to an object in memory may be considered a "current version" indicator since it may be updated to point to a modified copy of an object, thereby making the modified copy the "current" version of the object. In general, a collection of data (perhaps an object or a block of memory, but more generally an arbitrary collection of data) may have operations applied to it by threads that:

i) identify the "current" collection of data, perhaps by reading a "current pointer" or "current value identifier",
ii) copy the identified collection of data to a private area (and in some cases verify that the copy is consistent, retrying if not),
iii) apply changes to the private copy of the data, and
iv) attempt to cause the private copy to atomically become current, verifying that the copy previously identified is still current immediately before the change, perhaps using compare-and-swap (CAS) or load-linked/store-conditional synchronization primitives, retrying if unsuccessful.

A mechanism for modifying an object, data structure (or a portion of a data structure), or other block of shared memory by making a copy of the original object, modifying the copy of the object, and then atomically making the copy the current version of the object may be referred to herein as a copy-update-replace mechanism.

Additionally, transactional memory may be used to update the current copy of an object, a portion of a data structure, or other collection of data "in place" and thereby may avoid the necessity to make a copy of the data being modified. Using transactional memory may also allow parallelism (e.g., allowing more than on transaction or operation to occur concurrently), while still maintaining the ability to use a software mechanism to modify the collection of data if the transactional memory is unable to complete a particular operation. In other words, if the transactional memory mechanism is unable to complete the transaction to modify the collection of data in place, a set of software operations may be used to modify the collection of data, such as to make a copy of the data, modify the copy, and then atomically make the copy the "current" version.

Please note that while described herein mainly in terms of software operations that implement a copy-update-replace mechanism to modify data, such as an object, data structure, or block of shared memory, in some embodiments, transactions may cooperate and coordinate with software mechanisms when modifying shared data.

Figure 1:
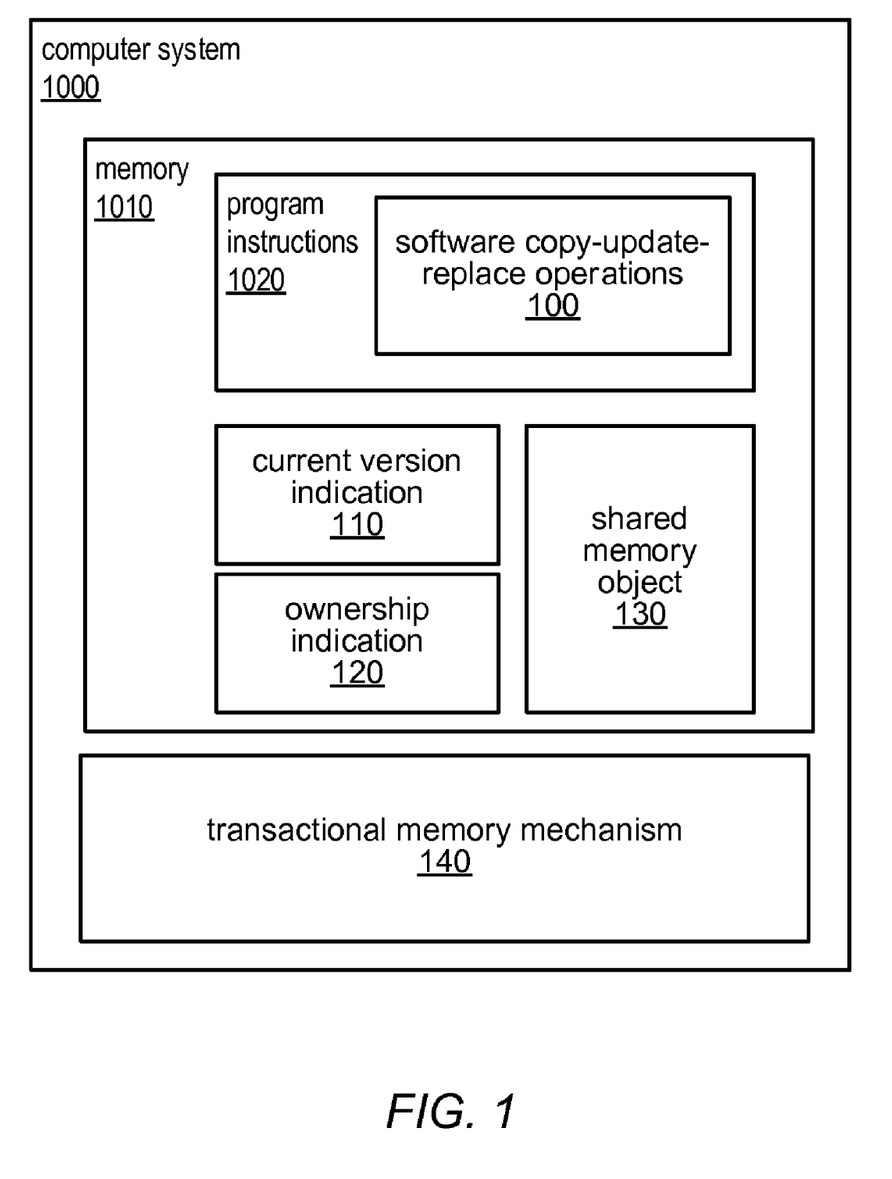
FIG. 1 is a block diagram illustrating a computer system implementing coordinated software copy-update-replace operations with transactional memory support, according to one embodiment.

For example, FIG. 1 illustrates a computer system including implementations of software operations for performing copy-update-replace operations and coordinating those operations with a transactional memory mechanism for modifying shared memory object, shared data structure or other collections of data. As illustrated in FIG. 1, a computer system 1000 may include software copy-update-replace operations 100, such as may be implemented in program instructions 1020 in memory 1010. The software operations 100 may be configured to modify, such as by using a copy-update-replace mechanism, shared memory object 130 using current version indicator 110 and ownership indicator 120, according to some embodiments. In some embodiments, shared memory object 130 may represent virtually any data structure or collection of data. A logical data structure may be represented by an indication of a current memory block and the contents of that block. A current version indication 110 may, in some embodiments, represent a pointer to shared memory object 130. Ownership indication 120 may either be stored with or separately from current version indication 110, according to different embodiments. Additionally, software operations 110 may coordinate and cooperate with transactional memory mechanism 140, as described herein. Transactional memory mechanism 140 may represent a hardware transactional memory (HTM) mechanism, a software transactional memory (STM) mechanism, or a hybrid software/hardware transactional memory (HyTM) mechanism, according to various embodiments. In general, any suitable transactional mechanism may be used as described herein regarding transactional memory mechanism 140.

For instance, in some embodiments, changes may applied to shared memory object 130, or another collection of data, using transactional memory mechanism 140, and current version indication 120 may be included in the readset of the transaction implemented by transactional memory mechanism 140. In general, transactional memory mechanisms may be configured to monitor various data locations read by the transaction to ensure that no other concurrent transaction (or other operations) modifies the same data locations. For example, transactional memory mechanism 140 may monitor current version indication 110 to detect if current version indication 110 is changed or modified by another concurrent operation or transaction during the transaction.

If transactional memory mechanism 140 is unable to commit a particular transaction on shared memory object 130 for some reason, a software copy-update-replace mechanism, such as software operations 100, may be used to perform the modifications to shared memory object 130. Any transactions executing concurrently on shared memory object 130 may be aborted because software operations 100 may change current version indication 110, such as to change a pointer to point to a modified copy of shared memory object 130. Thus, even if a particular transaction memory mechanism does not support all required transactions, a transaction may be attempted (to modify a block of shared memory) since a software copy-update-replace mechanism may be used for any transaction the transactional memory mechanism fails (or is unable) to complete or commit.

Additionally, hardware transactional memory mechanism 140 may only read (but not modify) current version indication 110 because hardware transactional memory mechanism 140 may modify shared memory object 130 in place, thereby avoiding making a copy of the shared memory object 130. Thus, when using a hardware transaction to update shared memory object 130 in place, current version indication 110 (e.g., a pointer to shared memory object 130) will already indicate the correct version of shared memory object 130 (since no copy was made).

In some embodiments, multiple concurrent transactions may succeed in parallel, provided they do not conflict any particular piece of the updated data. By contrast, software mechanisms, such as software copy-update-replace operations 100, may preclude such parallelism because each individual software copy-update-replace mechanism may modify the current version indication 110 (e.g., the pointer to the data being updated) in order to make their respective modifications current. Thus, no two software copy-update-replace mechanisms may operate on the same block of shared memory in parallel. In fact, no two software copy-update-replace mechanisms may operate on any block of shared memory referred to, or pointed to, by the same current version indication 110, even though the two software mechanisms may modify different portions of the block of shared memory. In contrast, multiple transactions may operate on the same block of shared memory as long as they do not attempt to modify the same locations or addresses within the block of shared memory because the transaction may modify the shared memory in-place and may not update the current version indication referring to the block of shared memory.

Additionally, transactional memory mechanisms 140 may be configured to coordinate with software copy-update-replace operations 100 by maintaining and monitoring an indication, such as ownership indication 120, of whether the particular object being modified, such as shared memory object 130, may be modified by a software mechanism, such as software operations 100 or a hardware mechanism, such as transactional memory mechanism 140. Thus, in some embodiments, ownership indication 120 may be used to indicate whether shared memory object, or in general any collection of data, may be modified (or attempted to be modified) by using a transaction to modify the data in place or by software copy-update-replace operations.

In one embodiment, ownership indication 120 may be included in, or stored with, current version indication 110. For example, as noted above, current version indication 110 may be a pointer to (the current version of) shared memory object 130. In some computer system implementations, all allocated memory blocks may be aligned such that the lowest order bit of the pointer is always zero. For example, all allocated memory locations may be word-aligned, thereby ensuring that the lowest order bit in any pointer is unneeded to specify the location of an allocated block of memory. Therefore, in some embodiments, ownership indication 120 may be stored in the lowest order bit of current version indication 110. For example, a value of '1' in the lowest order bit of current version indication 110 may represent an indication of a "transactional mode" in which transaction mechanism 140 may attempt to modify the shared memory referred to by current version indication 110. Similarly, a value of '0' in the lowest order bit of the current version indication 110 may represent an indication of a "software mode" in which software copy-update-replace operations 100 may attempt to modify the shared memory referred to by current version indication 110. In other embodiments, ownership indication 120 may be maintained or stored in other manners, such as in a table of ownership indications, as will be discussed subsequently.

The default value for ownership indication 120 may vary from embodiment to embodiment. For example, in some embodiments, ownership indication 120 may default to a "transaction mode" and may only be changed to indicate a "software mode" when a transaction (or multiple retries of a transaction) fails to successfully modify a block of shared memory associated with ownership indication 120. Transactions may verify that ownership indication 120 specifies a transactional mode before attempting or completing a transaction, and may abort a transaction if it detects that ownership indication 120 specifies a software mode. In such cases the transaction may be retried, either again using a transaction or, perhaps after a number of unsuccessful retries, using software copy-update-replace operations. If a software mode is indicated by ownership indication 120, a software mechanism, such as software operations 100, may modify the object. In some embodiments, ownership indication 120 may be changed to indicate a transactional mode before transactions can proceed again. Thus, ownership indication 120 for shared memory object 130 (or another collection of data) may initially specify that transactions may be attempted first and ownership indication 120 may be changed to indicate a software mode only if a transaction is unable to complete (e.g. commit modifications to the block of shared memory).

In some embodiments, the ownership indicator may be changed back to specify a transactional mode after the software operations have successfully modified the block of shared memory or coincident with the completion of a software operation so that the transactional memory mechanism may be attempted the next time the block of shared memory is modified. In other embodiments, however, the ownership indicator may remain unchanged, thus indicating a software mode, such as to prevent unnecessarily attempting a transaction that will likely fail to complete. Additionally, in some embodiments, the ownership indicator may be changed to indicate different modes for reasons other than because of limits or failure of a transactional memory mechanism. For example, it one embodiment, it may be more efficient to use a software copy-update-replace operation to modify data rather than using a transaction. Also application, system, or administration policy decisions may specify when a particular mode is required or preferred, according to various embodiments. For example, a policy may specify that each mode be retries a certain number of times before switching to another mode. Similarly, a policy may specify certain modes for certain situations, environments, or other special cases. Additionally, policies may specify that particular modes be used in response to certain types of transaction failures or other error conditions.

Note that the techniques described herein for coordinating transactional memory mechanisms with software mechanisms for modifying shared memory may be applied to multiple objects/data collections. For example, transactions in an object-based dynamic software transactional implementation may be performed entirely using transactions. Other transactions may be executed partially in hardware and partially in software. For example, the copy-update-replace software mechanism may be applied to some objects accessed by the implemented transaction, and the above-described hardware-assisted approach may be used to commit the software parts of the transaction and the remainder of the transaction atomically.

Figure 2:
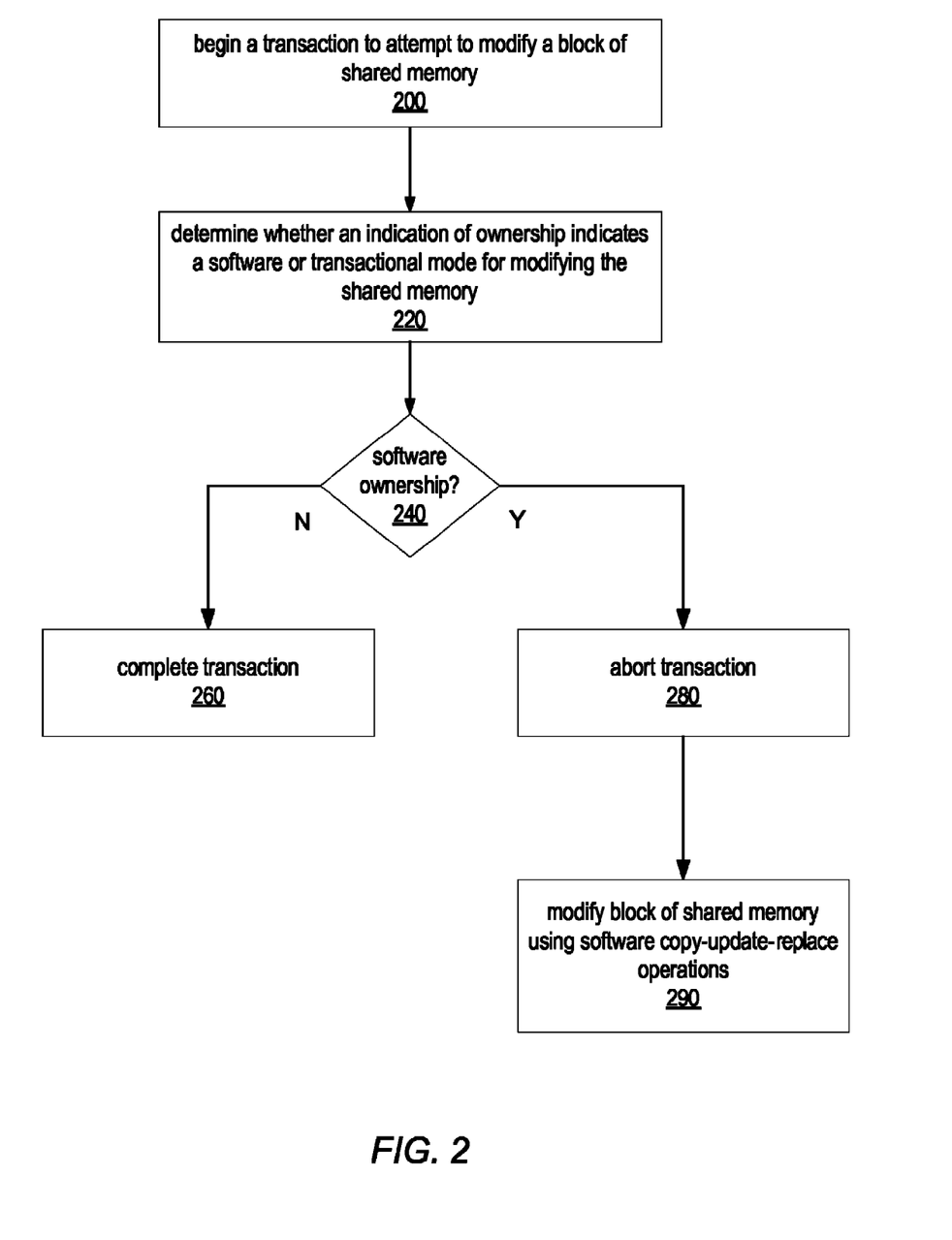
FIG. 2 is a flowchart illustrating one embodiment of a method for coordinating hardware and software data modification mechanisms according to an indication of ownership.

FIG. 2 is a flowchart illustrating one embodiment of a method for coordinating and hardware and software transactions according to an indication of ownership. In this example, a transaction may be initiated to attempt modify a block of shared memory, as in block 200. As described above, the transaction may determine whether an indication of ownership, such as ownership indication 120, indicates a software mode for modifying the shared memory, as illustrated by block 220. As noted above, ownership indication 120 may be stored or maintained in various ways, such as by making it a part of current version indication 110 or by storing it separately in a table or other collection of ownership indications, according to different embodiments.

If, as indicated by the positive output of decision block 240, ownership indication 120 specifies a software mode for modifying the block of shared memory, the transaction may be aborted, as illustrated by block 280. Subsequently, the shared block may be modified using software copy-update-replace operations, as in block 290. If however, as indicated by negative output of decision block 240, ownership indication 120 specifies a transactional mode for modifying the block of shared memory, the transaction may be completed, as illustrated by block 260.

As noted above, ownership indication 120 may be maintained or represented in any of various manners, such as by using an ownership table or other data structure. Each block of shared memory to be modified may be associated with a particular entry in the ownership table. In one example, each table entry may indicate either a software or transactional mode for modifying an associated object, block, or other collection of shared memory.

Each entry of an ownership table may, in one embodiment, include a transaction id (e.g., to indicate which transaction may currently be modifying the associated object), a version number, and/or other fields, such as to indicate whether the associated object is "owned" for reading or writing. As noted above, multiple transactions may read the block of shared memory concurrently with software operations that also read, but do not modify, the block of shared memory.

Additionally, a version number may be maintained for each block of shared memory (or each entry in an ownership table) in some embodiments. The version number may be increased (or at least changed) each time the associated block of shared memory is modified. In some embodiments, transactions and software operations may monitor the value in a version number to ensure that consistent versions of the data are read and/or to avoid the well-known ABA problem.

Figure 3:
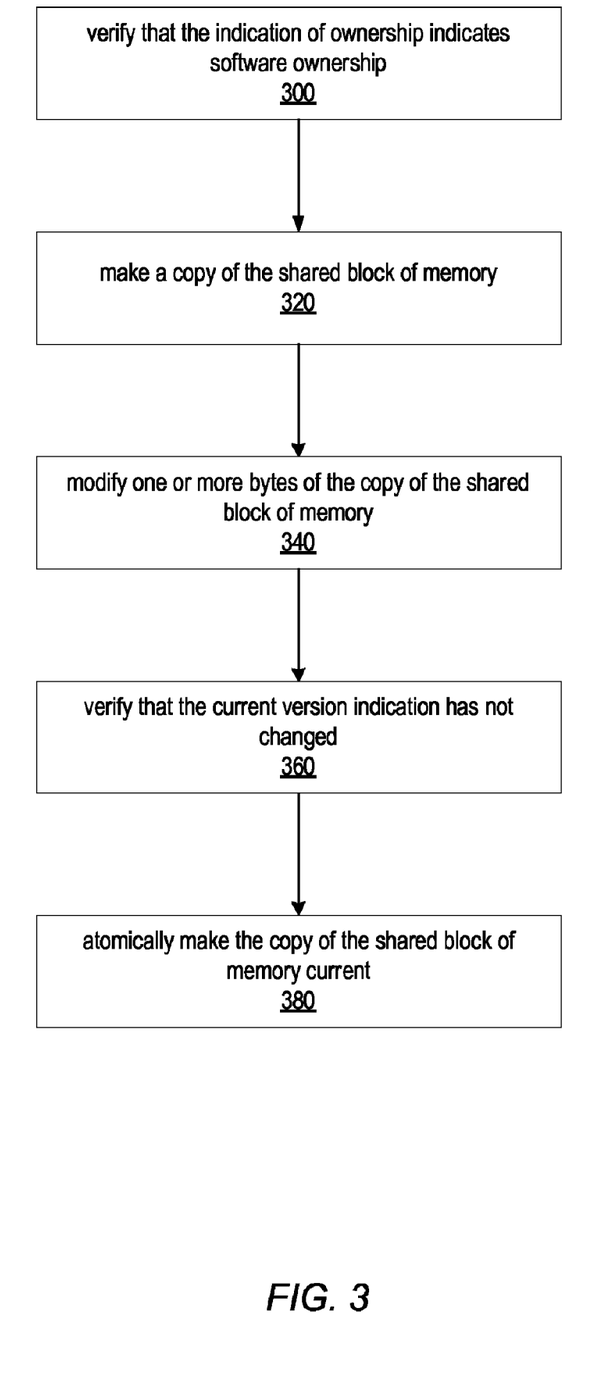
FIG. 3 is a flow chart illustrating one embodiment of a method for modifying a shared block of memory using software copy-update-replace operations.

As described above, if, when attempting to modify a shared memory object 130, transactional memory mechanism 140 determines that ownership indication 120 specifies a software mode for modifying shared memory object 130, the transaction may be aborted and software copy-update-replace operations 100 may attempt to modify the shared memory object. FIG. 3 is a flow chart illustrating one embodiment of a method for modifying a shared block of memory using software copy-update-replace operations. As shown in block 300, software operations 100 may verify that the ownership indication 120 indicates a software mode for modifying shared memory object 130. In other words, software operations 100 may verify that shared memory object 130 is currently "owned" by software or is in a "software-mode," or, in general, a non-transactional mode. As described above, software operations 100 may first make a private copy of the block of shared memory (e.g., shared memory object 130), as illustrated in block 320. Thus, there may exist (temporarily) two copies of shared memory object 130—the original or "current" version and a private copy created by software operations 100. In some embodiments, several versions of the shared memory object 130 may exist in addition to the "current" version. For example, there may be additional versions generated by additional software operations modifying the shared memory object and potentially other, "older" versions from previous modifications of shared memory object, depending upon how memory is reclaimed.

Software operations 100 may then modify one or more bytes of the private copy of the shared block of memory, as shown in block 340. In other words, software operations 100 may change some or all of the data in a private copy of shared memory object 130. Thus, while the private copy of shared memory object 130 may have been changed, updated or otherwise modified by software operations 100, the "current" copy pointed to by current version indication 110 will still represent the "original" version of shared memory object 130.

Subsequently, software operations 100 may verify that the current version indication 110 has not changed while software operations 100 created and modified the private copy of the shared memory object, as indicated by block 360. For example, in one embodiment, software operations 100 may have saved a copy of the value in current version indication 110 initially and then verify that the same value remains in current version indication 100 when atomically making the modified copy of shared memory object 120 current. Additionally, in some embodiments, a revision number may be maintained with the current version indicator and may be modified each time the version is changed, such as to allow software operations to confirm that the current version has not changed since being read previously.

Software operations 100 may atomically make the modified copy of the shared block of memory current, as shown in block 380. In some embodiments, software operations 100 may utilize a compare-and-swap (CAS) instruction to atomically modify the current version indication 110 to refer, or point, to the modified copy of shared memory object 130. In other embodiments, other mechanisms for atomically making the modified copy current, such as a double-compare-and-swap (DCAS) or load-linked/store-conditional pair (LL/SC) instruction. Thus, in some embodiments, software operations 100 may verify that the current version indication 100 hasn't changed as part of the same operation (e.g., CAS) that atomically makes the modified copy of the shared memory object current.

While mainly described herein using a compare-and-swap (CAS) or load-linked/store-conditional pair (LL/SC) instructions, in some embodiments, software operations 100 may utilize a separate transaction to update the pointer or current version indication 110 to refer to or point to the modified copy of the shared memory object 130. In some embodiments, the current version indication or ownership indication may be modified by operations that are compatible with a software or hybrid transactional memory implementation used to apply changes to the shared object in place.

Figure 4A:
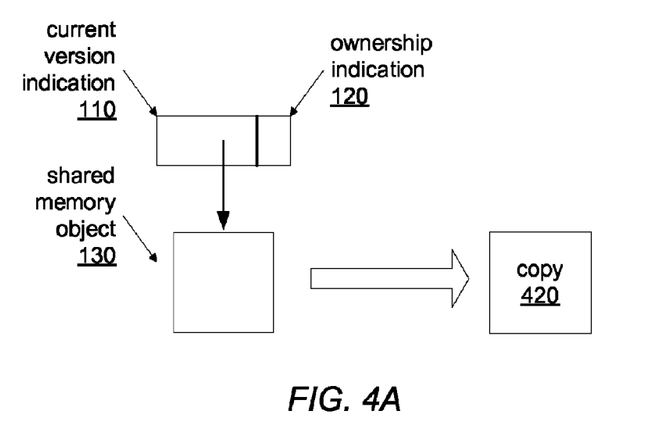
FIGS. 4A, 4B and 4C are block diagrams illustrating the various states involved in updating a block of shared memory using software copy-update-replace operations, according to one embodiment.
Figure 4B:
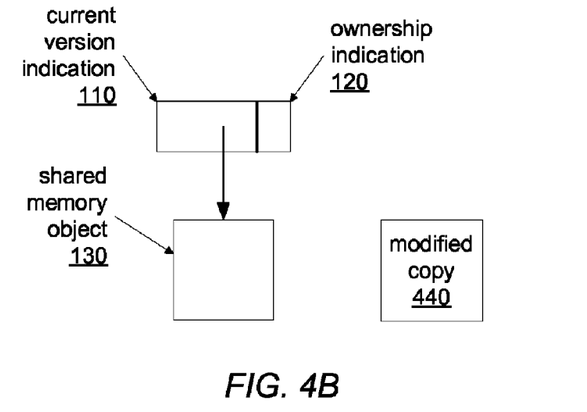
Figure 4C:
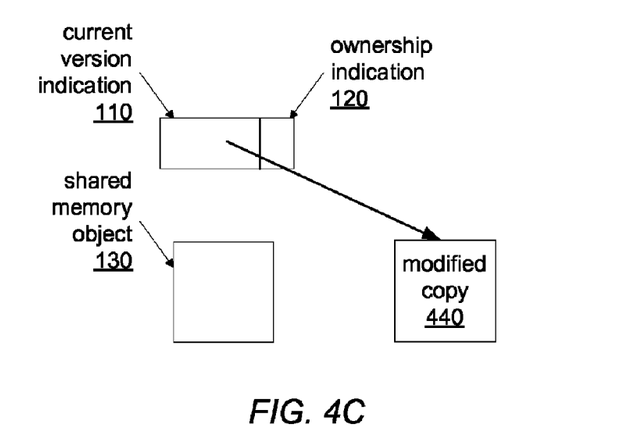

FIGS. 4A, 4B and 4C are block diagrams illustrating the various states involved in updating a block of shared memory using software copy-update-replace operations, such as software operations 100, that may coordinate with concurrent transactions, as described herein, according to various embodiments. For example, the states illustrated by FIG. 4A-4C may correspond to various stages in the method described above regarding FIG. 3.

FIG. 4A illustrates current version indication 110 referencing or pointing to shared memory object 130. FIG. 4A also illustrates ownership indication 120 included as part of current version indication 110, such as in a least significant bit of the pointer to shared memory object 130. As described above, when attempting to modify shared memory object 130, software operations 100 may first verify that ownership indication 120 indicates a software mode and if so, software operations may make a private copy 420 of shared memory object 130. At this point, copy 420 will be a duplicate of shared memory object 130. As illustrated in FIG. 4B, software operations 100 may then modify or update copy 420 to generate modified copy 440. At this point modified copy 440 is no longer a duplicate of shared memory object 130, however, current version indication 110 still references or points to shared memory object 130. Thus, as illustrated in FIG. 4C, software operations 100 may atomically make modified copy 440 the current version, such as by using a CAS operation to change current version indication 110. Please note, that in embodiments in which ownership indication 120 is maintained as part of current version indication 110, software operations 110 may be configured to be aware of and take into account the fact that part of all of current version indication 110 may represent ownership rather than reference the current version shared memory object 130. Therefore, in some embodiments, software operations 100 may be configured to atomically update current version indication 110 while ensuring that any portion of current version indication 110 representing ownership remains unchanged.

Figure 5:
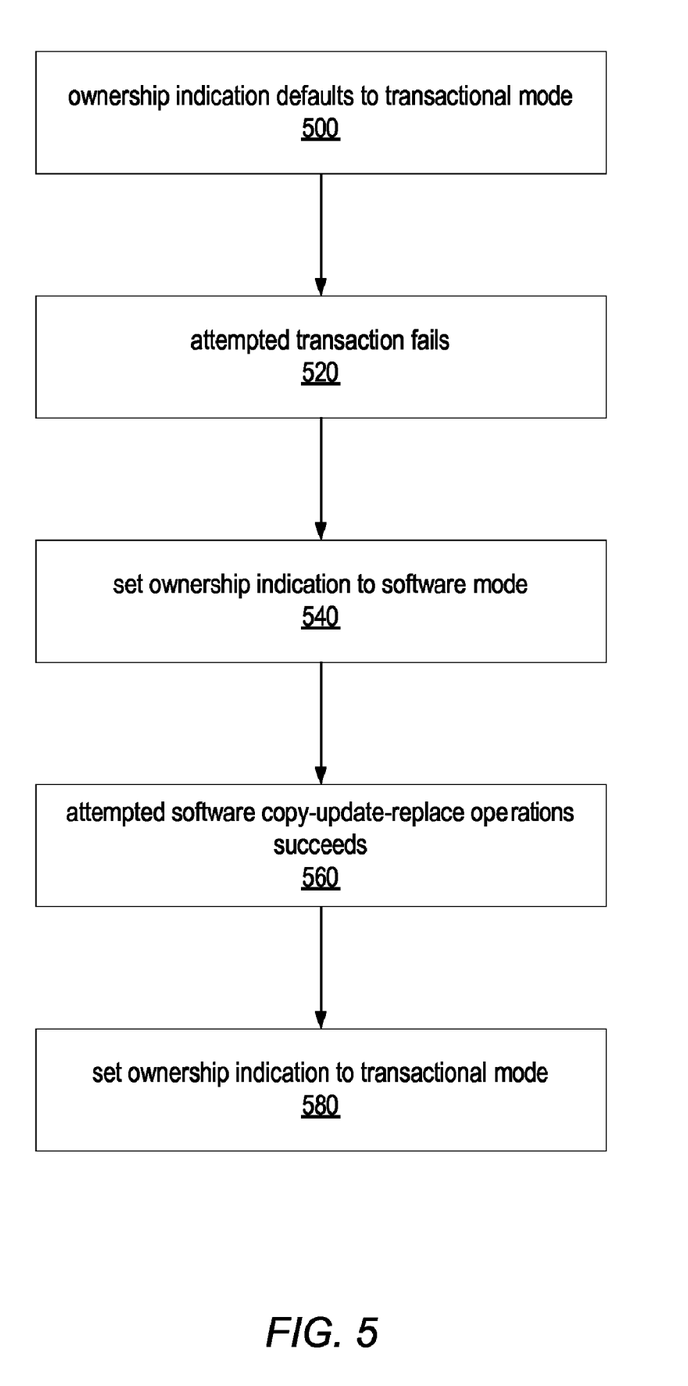
FIG. 5 is a flowchart illustrating one embodiment of a method for using an ownership indication to coordinate hardware and software mechanisms for modifying a block of shared memory.

As described above, ownership indication 120 may be changed between indicating a transactional or software mode, depending on whether or not an attempted transaction succeeded to modify a shared memory object. For instance, FIG. 5 is a flowchart illustrating one embodiment of a method for using an ownership indication to coordinate hardware and software mechanisms for modifying a block of shared memory. As indicated by block 500 and described above, an indication of ownership associated with a particular block of shared memory may default to a value indicating a transactional mode for modifying the block of shared memory. Thus, the block of shared memory may be considered "owned" by hardware or by transactional memory mechanism 140.

After one or more unsuccessful attempts to modify the block of shared memory using a transaction, as indicated by block 520, the ownership indication may be set to indicate a software mode for modifying the block of shared memory, as illustrated by block 540. As noted previously, transactional memory mechanisms may not be able to guarantee completion of any and every transaction. For instance, some transactional memory implementations may limit the number or size of memory locations that can be modified using a transaction. Thus, after a number of unsuccessful attempts using a transaction, the block of shared memory may be modified using software copy-update-replace operations which, in some embodiments, may require that the ownership indication for the block of shared memory indicate that block is "owned" by software (e.g., indicates a software mode for modifying the block of shared memory).

In some embodiments, after an attempted software copy-update-replace operation succeeds in modifying the block of shared memory, as illustrated by block 580, the ownership indication may be reset to indicate a transactional mode for modifying the block of shared memory. Thus, the next time the block of shared memory is to be modified, a transaction may be attempted again before using software copy-update-replace operations (if necessary). In other embodiments, not illustrated, the ownership indication may not be reset to indicate a transactional mode. For example, depending upon the reason(s) why the transaction failed to successfully modify the shared block of memory, the ownership indication may continue to indicate a software mode in order to avoid needlessly attempting transactions that are likely, or guaranteed, to fail.

While described herein mainly in reference to using a ownership indication specifying a binary hardware/software ownership for a block of shared memory (or other collection of data), in some embodiments, transactions may coordinate with software operations using a version or revision number that is increased each time a transaction or a set of software operations updates or attempts to update the block of shared memory. Thus, in some embodiments, ownership indication 120 may represent a revision number that may be increased with each modification of the block of shared memory.

Whoever is attempting to modify the block of shared memory may "claim" ownership of the block by changing the version or revision number, in some embodiments. In other embodiments, the revision number may not be updated until the modification to the block of shared memory are made current, such as by updating a pointer to point to a modified copy of the block of shared memory (in the case where software operations modified the block) or by modifying the data in place (in the case of a transaction).

Please note that when using a revision number to coordinate between transactions and concurrent software operations, the revision number may be separate and distinct from a current version indication, such as current version indication 110. For example, current version indication 110 may represent a pointer to the current version of a block of shared memory, while a revision number may be used to indicate that the block of shared memory has been modified and possibly how often it has been modified. Ownership indication 120 may represent a revision number increased each time the associated block of shared memory is modified. Thus, as used herein the term "revision number" may, in some embodiments, represent or be part of ownership indication 120.

Figure 6:
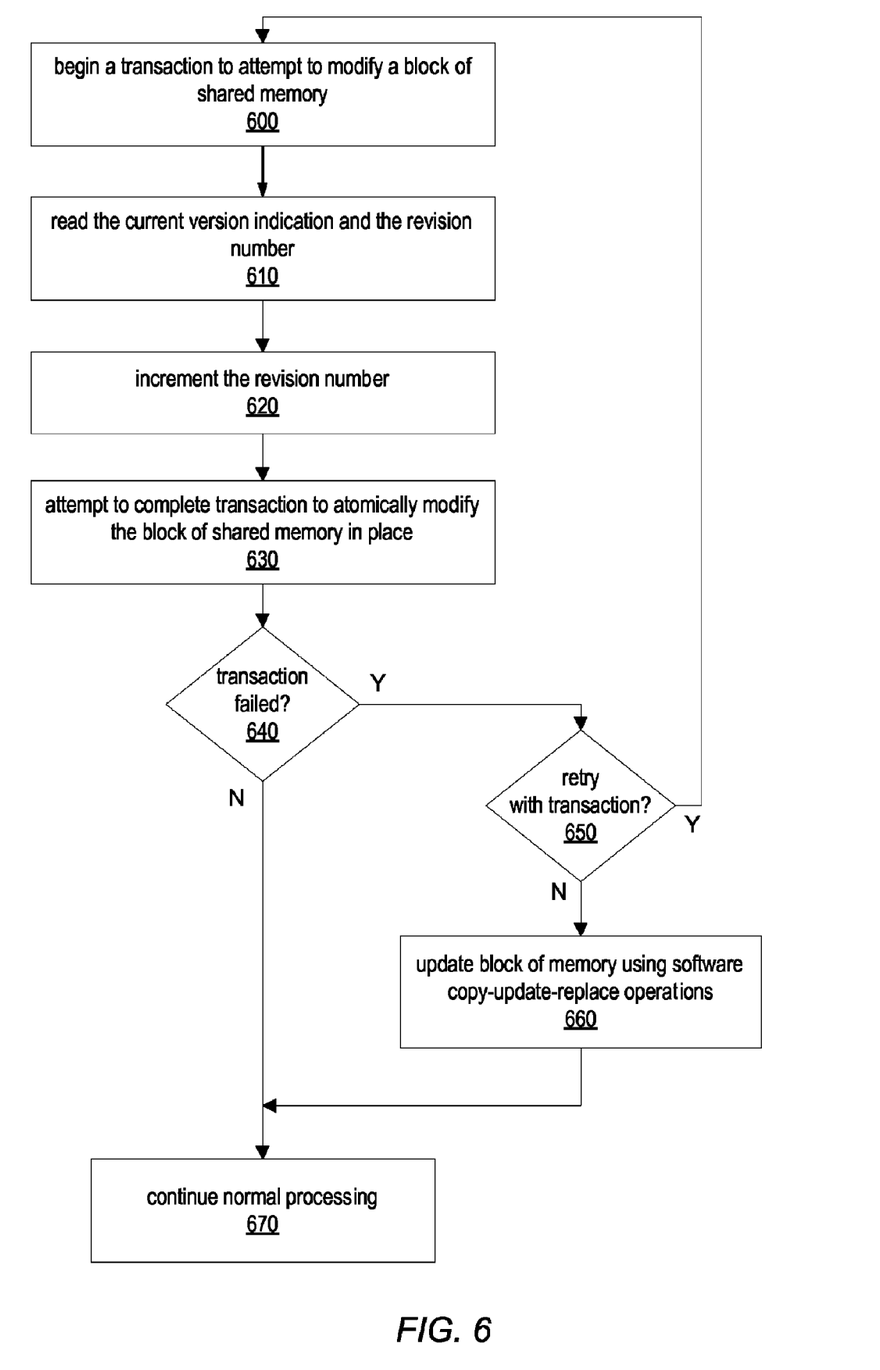
FIG. 6 is a flowchart illustrating one embodiment of a method for utilizing a revision number to coordinate between transactions and concurrent software operations when modifying a block of shared memory.

FIG. 6 is a flowchart illustrating one embodiment of a method for utilizing a revision number to coordinate between software operation and transactions when modifying a block of shared memory. As indicated by block 600, a transaction may be attempted to modify a block of shared memory. As noted above, the transaction may verify that a revision number or other ownership indication does not change while the transaction is performed. As illustrated in block 610, the transaction may read both the current version indicator and the revision number, such as to ensure that they are included within the transactional scope of the transaction in order to determine whether the current version indicator or the revision number changes during the execution of the transaction. In general, transactional memory implementations automatically monitor every address or location accessed by the transaction to detect if the contents of any of the addresses or locations changes, such as by a concurrent software operation or another transaction.

Additionally, the transaction may increment the revision number, as indicated by block 620. The new revision number will not become current (e.g., available or viewable to other transactions, processes, thread, etc.) until the transaction commits. Thus, the transaction may attempt to complete or commit in order to atomically modify the block of shared memory in place, as indicated by block 630. If the transaction fails to complete or commit, as indicated by the positive output of decision block 640, the transaction may be retried a number of times, as indicated by the positive output of decision block 650. As noted above, a transaction may fail for any of a number of reasons, such as if another transaction, thread, process, etc., changes the revision number during the execution of the transaction. If however, the transaction is not to be retried, the block of shared memory may be updated using software copy-update-replace operations, as described previously.

The techniques, methods, and systems described herein may be implemented in and/or applied to a variety of systems. For example, a compiler may construct code that allows multiple compatible transaction implementation techniques to be used in the same program, and at the same time. Thus, programmers may write code once using familiar coding styles, but modifications to shared memory to be effected according to one of a number of compatible alternative implementation techniques. For example, a programmer may not know whether updates to a shared object are implemented in place using a transaction or implemented using software copy-update-replace operations, as described herein. Programmers may not need to write multiple versions of their code in order to exploit alternative implementation approaches, or even be specifically aware of the particular implementations utilized. Instead the code written by the programmer may be translated, replaced or transformed by a compiler or other development system into a code that is configured to implement modifications to shared memory according to any of various techniques. In some embodiments, the particular technique implemented for each modification may not be decided until runtime. At runtime, any of the various implemented techniques may be used to effect the modifications and if a first technique, such as a transaction, fails or is inappropriate for a particular situation, one or more other techniques, such as using software copy-update-replace operations, may be attempted.

In general, a transactional memory may be presented to a programmer simply as a memory subsystem (e.g., using hardware and/other facilities not entirely visible to application code executing on a processor), using software constructs that define an interface to the transactionally-managed memory (e.g., via a defined calling interface for transactional access), or as a hybrid interface that supports both hardware-mediated and software-mediated access to a transactional memory space. Accordingly, these techniques may be implemented using mechanisms introduced into a variety of components of a computational system. These techniques may be implemented in a variety of manners including:

(a) as a software transactional memory interface that leverages and coordinates with an underlying transactional memory facility, in part, by augmenting transactions destined for evaluation by the transactional memory with additional transactional locations for coordination with concurrently executing software-mediated transactions, if any;

(b) as a hardware-mediated transactional memory implementation (e.g., a memory subsystem) that automatically includes additional transactional locations within the transactional scope of implemented transactions for coordination with concurrently executing software-mediated transactions, if any; and/or (c) as a code preparation environment, compiler, execution environment (or computer program product resulting from operation of any of the foregoing) that augments transaction sequences to include accesses to additional memory locations (beyond those required for the programmer-defined transaction semantics) in order to detect conflicts, if any, with concurrently executing software-mediated transactions.

Additionally, in some embodiments, details regarding the particular environment in which an application is executing may affect which implementations or techniques may or may not be available or appropriate for use when atomically modifying shared memory object or other collections of data. For example, some transaction techniques may not be usable when an application is executed in debug mode or when a breakpoint has been set. In other embodiments, certain techniques may not be usable when the application is executed under particular environments. Furthermore, a variety of techniques may be employed to control which techniques may be executed together under what circumstances. For example, compile-time options, runtime detection of available hardware support, runtime decisions by supporting library routines, etc., may be taken into account when deciding which particular technique to use.

In general, different sets of alternative code paths for implementing modifications to shared memory may be available and compatible according to available hardware support, algorithmic techniques used in the alternative implementations, and runtime conditions, such as potential conflicts (or lack thereof) between them, or specific memory access patterns or other aspects of the particular transaction.

Please note that the blocks illustrated in FIGS. 2, 3, 5 and 6 represent only one of many possible embodiments of the methods described above. Other embodiments may use fewer, additional, or different actions to accomplish the same result and may perform those actions in different orders than those illustrated.

Figure 7:
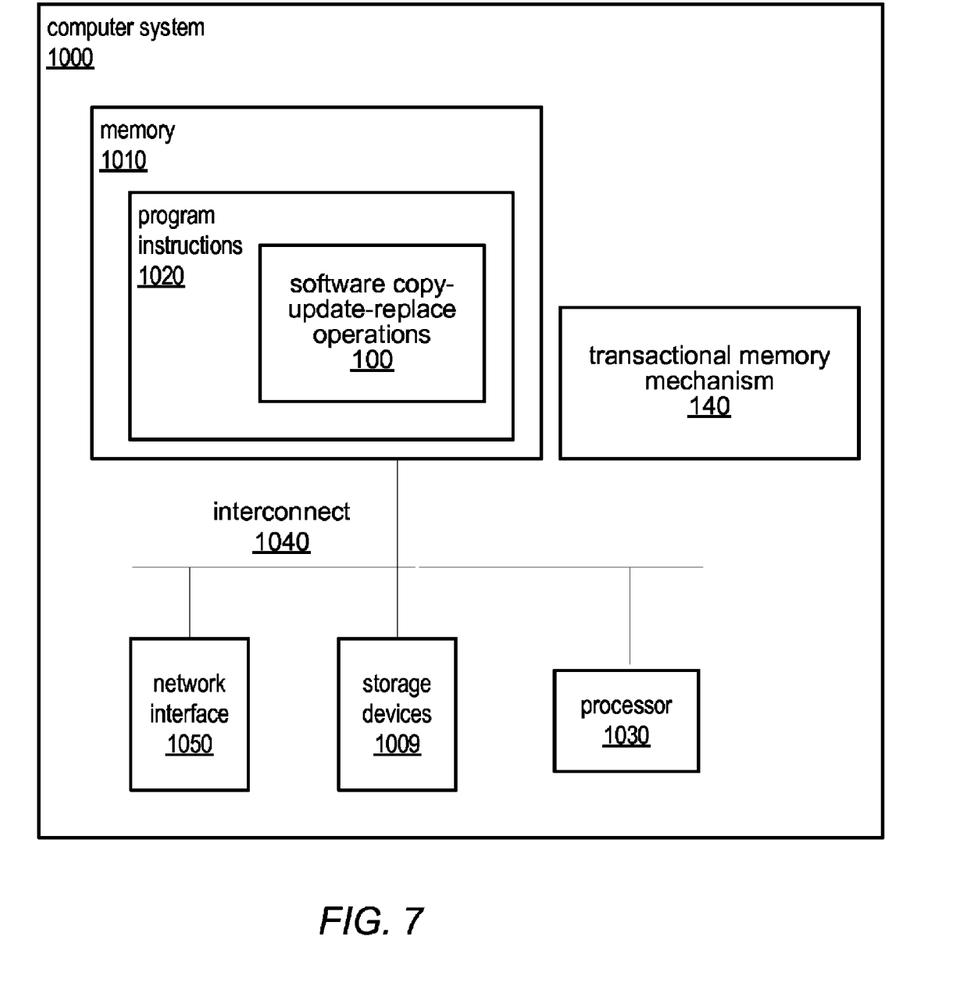
FIG. 7 is a block diagram illustrating an exemplary computer system capable of implementing multiple, alternative methods for executing transactions according to one embodiment.

FIG. 7 illustrates a computing system capable of coordinating transactions and concurrent software operations, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1000 may include a processor unit 1030 (possibly including multiple processors, a single threaded processor, a multi-threaded processor, a multi-core processor, etc.). The computer system 1000 also includes one or more system memories 1010 (e.g., one or more of cache, SRAM DRAM, RDRAM, EDO RAM, DDR RAM, SDRAM, Rambus RAM, EEPROM, etc.), a system interconnect 1040 (e.g., LDT, PCI, ISA, etc.), a network interface 1050 (e.g., an ATM interface, an Ethernet interface, a Frame Relay interface, etc.), and a storage device(s) (e.g., optical storage, magnetic storage, etc.). The memory medium may include other types of memory as well, or combinations thereof. Embodiments of the invention may include fewer or additional components not illustrated in FIG. 10 (e.g., video cards, audio cards, additional network interfaces, peripheral devices, etc.). The processor unit 1030, the storage device(s) 1009, the network interface 1050, and the system memory 1010 are coupled to the system interconnect 1040. One or more of the system memories 1010 may embody a compiler configured to provide multiple, alternative methods for implementing modifications to collections of data or blocks of shared memory. Additionally, one or more of the system memories 1010 may embody an application including code specifying one or more atomic transactions.

In some embodiments, memory 1010 may include program instructions 1020 configured to implement a compiler configured to provide multiple, alternative methods for implementing modifications to shared memory, as described herein. Application source code, such as to implement transactions or software operations may be implemented in any of various programming languages or methods. For example, in one embodiment application source code may be JAVA based, while in another embodiments, they may be written using the C or C++ programming languages. Similarly, application 110 may be Java, C, or C++, among other programming languages, according to various embodiments.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
using a computer to perform:
determining whether an indication of ownership for a portion of a shared memory specifies that attempts to modify the portion of the shared memory should be made in a non-transactional software-mode or specifies that attempts to modify the portion of the shared memory should be made in a transactional-mode, wherein the portion of the shared memory stores the current contents of a shared data structure; and
subsequent to said determining:
selecting between using a transaction and using software operations for attempting to modify the portion of the shared memory, wherein selecting between using a transaction and using software operations is dependent on whether the indication of ownership specifies that attempts to modify the portion of the shared memory should be made in the transactional-mode or specifies that attempts to modify the portion of the shared memory should be made in the non-transactional software-mode; and
attempting to modify a value of the portion of the shared memory using a transaction or using software operations, dependent on said selecting.

2. The method of claim 1, further comprising, subsequent to attempting to modify the value of the portion of the shared memory using a transaction, using the computer to perform:
determining that the transaction failed to complete; and
in response to determining that the transaction failed to complete:
setting the indication of ownership for the portion of the shared memory to specify that a subsequent attempt to modify a value of the portion of the shared memory should be performed in the non-transactional software-mode; and
modifying the value of the portion of the shared memory using software operations.

3. The method of claim 1, wherein attempting to modify the value of the portion of the shared memory using software operations comprises:
making a copy of the portion of the shared memory, wherein the copy of the portion of the shared memory is private to a process comprising the software operations;
modifying one or more bytes of the copy of the portion of the shared memory; and
atomically making the copy of the portion of the shared memory current, wherein making the copy of the portion of the shared memory current makes the results of said modifying one or more bytes of the copy of the portion of the shared memory available to other concurrently executing software operations or transactions.

4. The method of claim 3, wherein said atomically making the copy of the portion of the shared memory current comprises updating a current version indication to indicate that the copy of the portion of the shared memory is now the current version of the portion of the shared memory.

5. The method of claim 4, wherein the current version indication for the portion of the shared memory comprises the indication of ownership.

6. The method of claim 5, wherein the current version indication comprises a memory pointer to the copy of the portion of the shared memory.

7. The method of claim 6, wherein the indication of ownership and the current version indication are encoded together in a single modifiable shared variable.

8. The method of claim 1, wherein attempting to modify the value of the portion of the shared memory using the transaction comprises including the indication of ownership within the scope of the transaction.

9. The method of claim 1, wherein attempting to modify the value of the portion of the shared memory using the transaction comprises:
determining that the transaction failed to complete; and
in response to said determining that the transaction failed to complete, setting the ownership indication to specify that a subsequent attempt to modify the value of the portion of the shared memory should be performed in the non-transactional software-mode; and
attempting to modify the value of the portion of the shared memory using software operations.

10. The method of claim 1, wherein attempting to modify the value of the portion of the shared memory using the transaction comprises including an indication of a current version of the portion of the shared memory within the scope of the transaction to ensure that the transaction does not complete successfully if the current version changes during the execution of the transaction.

11. The method of claim 10, wherein attempting to modify the value of the portion of the shared memory using the transaction further comprises:
determining that the transaction failed to complete; and
in response to said determining that the transaction failed to complete:
determining a mode for modifying the value of the portion of the shared memory dependent on one or more policies, where the mode is one of the transactional-mode or the non-transactional software-mode;
attempting to modify the value of the portion of the shared data structure using the determined mode; and
setting the ownership indication to specify that attempts to modify the value of the portion of the shared memory should be performed in the non-transactional software-mode if the determined mode is the non-transactional software-mode.

12. A method, comprising:
using a computer to perform:
determining whether an indication of ownership for a portion of a shared memory specifies that attempts to modify the portion of the shared memory should be made using one shared data modification technique or that attempts to modify the portion of the shared memory should be made using another, different, shared data modification technique, wherein at least one of the one shared data modification technique and the another shared data modification technique uses a transaction mechanism, and wherein the portion of the shared memory stores the current contents of a shared data structure; and subsequent to said determining:

selecting between using the one data modification technique and using the another data modification technique for attempting to modify the portion of the shared memory, wherein selecting between using the one shared data modification technique and the another shared data modification technique is dependent on whether the indication of ownership specifies that attempts to modify the portion of the shared memory should be made using the one shared data modification technique or specifies that attempts to modify the portion of the shared memory should be made using the another shared data modification technique; and attempting to modify a value of the portion of the shared memory using the one shared data modification technique or using the another shared data modification technique, dependent on said selecting.

13. The method of claim 12, further comprising, subsequent to attempting to modify the value of the portion of the shared memory using the one shared data modification technique, using the computer to perform:

determining that the attempt to modify the value of the portion of the shared data structure using the one shared data modification technique failed to complete; and in response to determining that the attempt to modify the value of the portion of the shared data structure using the one shared data modification technique failed to complete:

setting the indication of ownership for the portion of the shared memory to specify that a subsequent attempt to modify a value of the portion of the shared memory should be performed using the another shared data modification technique; and modifying the value of the portion of the shared memory using the another shared data modification technique.

14. The method of claim 12, wherein attempting to modify the value of the portion of the shared memory using the another shared data modification technique comprises:

making a copy of the portion of the shared memory, wherein the copy of the portion of the shared memory is private to a process comprising the software operations;

modifying one or more bytes of the copy of the portion of the shared memory; and atomically making the copy of the portion of the shared memory current, wherein making the copy of the portion of the shared memory current makes the results of said modifying one or more bytes of the copy of the portion of the shared memory available to concurrently executing process or threads that are using one or more other shared data modification techniques.

15. The method of claim 14, wherein said atomically making the copy of the portion of the shared memory current comprises updating a current version indication to indicate that the copy of the portion of the shared memory is now the current version of the portion of the shared memory.

16. The method of claim 15, wherein the current version indication for the portion of the shared memory comprises the indication of ownership.

17. The method of claim 16, wherein the current version indication comprises a memory pointer to the copy of the portion of the shared memory.

18. The method of claim 17, wherein the indication of ownership and the current version indication are encoded together in a single modifiable shared variable.

19. The method of claim 12, wherein attempting to modify the value of the portion of the shared memory using the one shared data modification technique comprises:

determining that the one shared data modification technique failed to complete; and in response to said determining that the one shared data modification technique failed to complete:

determining a modification technique to be used when attempting to modify the value of the portion of the shared memory dependent on one or more policies, where the modification technique is one of: the one shared data modification technique or the another shared data modification technique;

setting the ownership indication to specify that attempts to modify the value of the portion of the shared memory should be performed using the another shared data modification technique if the determined modification technique is the another shared data modification technique; and attempting to modify the value of the portion of the shared data structure using the determined technique.

20. A system, comprising:

a processor; and a memory coupled to the processor, wherein the memory stores program instructions that when executed by the processor, cause the processor to perform:

determining whether an indication of ownership for a portion of a shared memory specifies that attempts to modify the portion of the shared memory should be made in a transactional mode or specifies that attempts to modify the portion of the shared memory should be made in a non-transactional mode, wherein the portion of the shared memory stores the current contents of a shared data structure; and subsequent to said determining, attempting to modify a value of the portion of the shared memory using a transaction if the indication of ownership specifies that attempts to modify the portion of the shared memory should be made in the transactional mode; or attempting to modify the value of the portion of a shared data structure using software operations if the indication of ownership specifies that attempts to modify the portion of the shared memory should be made in the non-transactional mode.

* * * * *